(12) United States Patent
Hawksworth et al.

(10) Patent No.: US 10,823,264 B2
(45) Date of Patent: Nov. 3, 2020

(54) ACTUATOR

(71) Applicant: Goodrich Actuation Systems Limited, West Midlands (GB)

(72) Inventors: Andrew Hawksworth, Moreton (GB); Antony Morgan, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 200 days.

(21) Appl. No.: 15/984,598

(22) Filed: May 21, 2018

(65) Prior Publication Data
US 2018/0335115 A1 Nov. 22, 2018

(30) Foreign Application Priority Data

May 22, 2017 (EP) .................................. 17172286

(51) Int. Cl.
*F16H 25/24* (2006.01)
*F02K 1/76* (2006.01)

(52) U.S. Cl.
CPC ......... *F16H 25/2454* (2013.01); *F02K 1/766* (2013.01)

(58) Field of Classification Search
CPC ...... F16H 25/2454; F16H 25/20; F16H 25/24; F16H 2025/2463; F02K 1/766; F02K 1/163; F02K 1/32; F16B 15/261
See application file for complete search history.

(56) References Cited

U.S. PATENT DOCUMENTS

| | | | |
|---|---|---|---|
| 6,935,097 B2 | 8/2005 | Eschborn | |
| 7,044,263 B2 * | 5/2006 | Fischbach | B62D 5/0424 180/443 |
| 7,216,581 B2 | 5/2007 | McAuley | |
| 8,042,417 B2 | 10/2011 | Davies et al. | |
| 8,715,132 B2 | 5/2014 | Kopecek | |
| 9,188,081 B2 | 11/2015 | Wingett et al. | |
| 9,347,535 B1 | 5/2016 | Sheahan, Jr. et al. | |
| 9,464,645 B2 * | 10/2016 | Dyer | F15B 15/261 |
| 2007/0220998 A1 * | 9/2007 | Kopecek | B64C 13/28 74/89.39 |
| 2014/0216248 A1 * | 8/2014 | Kopecek | F02K 1/763 92/261 |
| 2015/0253805 A1 | 9/2015 | Burghdoff | |
| 2016/0123275 A1 * | 5/2016 | Arnaud | F02K 1/763 74/89.39 |
| 2016/0131081 A1 | 5/2016 | Maalioune et al. | |

OTHER PUBLICATIONS

European Search Report for Application No. 17172286.1-1607 dated Nov. 29, 2017, 7 pages.

* cited by examiner

*Primary Examiner* — Patrick Cicchino
(74) *Attorney, Agent, or Firm* — Cantor Colburn LLP (57) ABSTRACT

An actuator comprises a ball nut and a lock housing arranged radially outwardly of the ball nut and overlapping a proximal end of the ball nut when the ball nut is in a stowed position. The lock housing comprises a sleeve in which is located an aperture, and a locking element is retained within the aperture and can move in a radial direction through the aperture. When the ball nut is in the stowed position, the locking element engages with a locking projection on the ball nut, to retain the ball nut in the stowed position.

14 Claims, 8 Drawing Sheets

ACTUATOR

FOREIGN PRIORITY

This application claims priority to European Patent Application No. 17172286.1 filed May 22, 2017, the entire contents of which is incorporated herein by reference.

TECHNICAL FIELD

The present disclosure relates to an actuator, for example an actuator for driving the components of a thrust reverser in a gas turbine engine, and particularly in a turbofan engine. The actuator may for example be an actuator for a thrust reverser actuator system (TRAS) of an aircraft.

BACKGROUND

Gas turbine engines, which are often used to propel aircraft, typically comprise an engine core which is surrounded by a nacelle. A bypass air duct is formed between the engine core and the nacelle. Air which enters the gas turbine engine is driven by a fan assembly along the bypass duct and provides a forward thrust at the rear of the engine.

In certain situations, such as during landing, it is necessary to slow the speed of the aircraft down significantly. Whilst this can partially be achieved using air brakes which are often present on the wings of an aircraft, it is also necessary to provide a reverse thrust from the gas turbine engines in order to further reduce the speed of the aircraft. In order to divert some of the air which passes through the engine to provide a reverse thrust, a thrust reverser may be arranged in the nacelle surrounding the fan assembly. Thrust reverser actuation systems may operate using a clamshell, blocker door or translating cowl arrangement. Such systems include an actuator connected to the thrust reverser arrangement which moves between a stowed and deployed position in order to deploy the thrust reverser. The actuator may for example include a ball nut on a ball screw shaft, the ball nut being movable along the ball screw shaft. The ball nut may be connected to the thrust reverser arrangement such that movement of the ball nut along the ball screw shaft between a stowed and deployed position moves the thrust reverser arrangement correspondingly between a stowed and a deployed position.

When there is no need to deploy the thrust actuator, it is desirable to lock the actuator (and hence the thrust reverser) in the stowed position to avoid accidental deployment of the thrust reverser.

A known way of locking the actuator is to provide a tine lock which locks the ball nut in its stowed position. Such a tine lock comprises a split collet which has a plurality of clawed fingers which are able to deflect radially outwardly. The clawed fingers are shaped to engage with a locking projection on the ball nut.

In use, the ball nut and tine lock are moved relative to one another along a common axis to bring the tine lock over the end of the ball nut. As the ball nut and tine lock are moved further towards one another, the clawed fingers of the tine lock flex radially outwardly and ride up over a conical outer surface of the ball nut which defines one edge of a locking projection on the ball nut. As the ball nut and tine lock are moved further towards one another, the clawed fingers of the tine lock reach the end of the locking projection, and hook over the end of it, thereby locking the ball nut in position.

Repeated flexing of the clawed fingers may lead to fatigue and possibly to eventual failure of the tine lock. The fatigue lifetime is related to the ratio of the length of the clawed fingers along which the fingers deflect (i.e. the tine bending beam length) to the distance that the clawed fingers deflect in the radial direction. The latter distance is set by the height of the locking projection which the fingers engage with. For a given radial deflection, the longer the tine bending beam length, the longer the fatigue life of the tine lock. Providing a longer tine bending beam length necessitates that the actuator has a correspondingly longer overall length, to accommodate the longer tine bending beam length.

An improved mechanism is sought for locking an actuator in a stowed position.

SUMMARY

The present disclosure can be seen to provide an actuator comprising: a ball nut movable along an axis, and a lock housing arranged radially outwardly of the ball nut and overlapping a proximal end of the ball nut when the ball nut is in a stowed position, wherein the lock housing comprises a sleeve in which is located an aperture, and wherein a locking element is retained within the aperture and can move in a radial direction through the aperture, wherein when the ball nut is in the stowed position, the locking element engages with a locking projection on the ball nut, to retain the ball nut in the stowed position.

The locking projection on the ball nut may define at least partially a recessed portion of the ball nut, and the locking element may sit in the recessed portion of the ball nut when the ball nut is in the stowed position.

The locking projection on the ball nut may be chamfered when viewed in cross-section. That is, the locking projection on the ball nut may comprise a frustro-conical surface. The locking projection on the ball nut may comprise two frustro-conical surfaces, one surface on each of the proximal and distal sides of the locking projection.

The locking element may be chamfered when viewed in cross-section. The locking element may have four chamfered surfaces. That is, the locking element may comprise four frustro-conical surfaces, two surfaces on each of the proximal and distal sides of the locking element, one radially outward and one radially inward.

The distal and proximal radially inward surfaces of the locking element may respectively ride over (engage) the proximal and distal sides of the locking projection on the ball nut, depending on the relative positions of the ball nut and the locking element. The engaging surfaces may have complementary chamfers, when viewed in cross-section.

The distal radially inward surface of the locking element may ride over the proximal side of the locking projection on the ball nut. The distal radially inward surface of the locking element may have a frustro-conical surface complementary to the frustro-conical surface of the proximal side of the locking projection on the ball nut.

The proximal radially inward surface of the locking element may ride over and engage with the distal side of the locking projection on the ball nut. The proximal radially inward surface of the locking element may have a frustro-conical surface complementary to the frustro-conical surface of the distal side of the locking projection on the ball nut.

By "complementary", it is meant that the two complementary surfaces ride over one another smoothly. The two complementary surfaces may be parallel.

The lock housing may be anchored to a housing of the actuator and may not move relative thereto. The ball nut may be configured to move relative to the lock housing.

A locking collar may be arranged outwardly of the lock housing. The locking collar may overlap (at least partially) the lock housing. The locking element may extend between an inner periphery of the locking collar and an outer periphery of the ball nut when the ball nut is in the stowed position.

That is, a compressive force may be applied on the locking element from the locking collar and the ball nut when the ball nut is in the stowed position.

The locking collar may be arranged to move (along the axis) towards a distal end of the ball nut (i.e. an end of the ball nut opposite to the proximal end of the ball nut) to align a recessed portion of the locking collar with the locking element to allow the locking element to ride up over the locking projection of the ball nut into the recessed portion of the locking collar, thereby disengaging the locking element from the locking projection on the ball nut, allowing movement of the ball nut.

That is, a recessed portion of the locking collar may be aligned with the recessed portion of the ball nut, to allow the locking element sitting in the recessed portion of the ball nut to move radially outwards, out of the recessed portion of the ball nut, and into the recessed portion of the locking collar.

A distal edge of the recessed portion of the locking collar may be chamfered, when viewed in cross section. That is, the distal edge of the recessed portion of the locking collar may comprise a frustro-conical surface.

The distal radially outward surface of the locking element and the distal edge of the recessed portion of the locking collar may have a complementary chamfer, when viewed in cross section.

The distal radially outward surface of the locking element may engage with distal edge of the recessed portion of the locking collar, when the ball nut is moving toward or away from the stowed position.

The distal radially outward surface of the locking element may engage with the distal edge of the recessed portion of the locking collar. The distal radially outward surface of the locking element may have a frustro-conical surface complementary to the frustro-conical surface of the distal edge of the recessed portion of the locking collar.

The extent of the locking element in the radial direction may be the same as the distance between the outer periphery of the ball nut and the inner periphery of the locking collar in the stowed position.

The actuator may comprise a solenoid which drives movement of the locking collar.

The solenoid may be deactivated when the ball nut is in the stowed position.

The actuator may comprise a hydraulic system which drives movement of the locking collar.

The actuator may comprise a resilient element, for example a spring (optionally a plurality of springs), which provides a restoring force to return the locking collar to the locking position.

The locking element may comprise a slit, within which is provided a split pin arranged to retain the locking element within the lock housing when the ball nut is in an unlocked position.

The ball screw may be provided on a ball screw shaft.

The actuator may comprise a plurality of locking elements, and a corresponding plurality of apertures in the lock housing.

The actuator may comprise two to four locking elements, and a corresponding number of apertures in the lock housing.

The actuator may comprise three locking elements, and, correspondingly, three apertures in the lock housing.

For a given load, there may be a lower limit on the area of the locking elements which must be in contact with the outer periphery of the ball nut and the inner periphery of the locking collar, in order to secure the ball nut. This contact area may be defined by the diameter of the sleeve and the total proportion of the sleeve around which the plurality of locking elements extend, and the extent of each locking element in the axial direction. An actuator which experiences a higher load may require a larger surface area to secure the ball nut, compared to an actuator which experiences a lower load. For two actuators with the same diameter sleeve, one of which experiences a higher load than the other, for the actuator which experiences a higher load, the plurality of locking elements may together extend around a greater proportion of the circumference sleeve, and/or each locking element may have a longer extent in the axial direction, compared to the actuator which experiences a lower load.

The plurality of locking elements may together extend around a total proportion of between 20% to 70% of the circumference of the sleeve, optionally 40% to 60%.

Each locking element may extend around between 10% to 20% of the circumference of the sleeve.

The extent of the or each locking element in the axial direction may be between 10 and 100 mm, optionally between 30 and 80 mm, and optionally between 40 and 60 mm.

The present disclosure can be seen to provide a thrust reverser actuation system comprising the actuator described in any of the statements above, wherein the actuator is configured to move a portion of a thrust reverser system. Optionally the portion is a surface of the thrust reverser system (for example, a blocker door, clamshell or cowl).

The thrust reverser actuation system may be a thrust reverser actuation system for a gas turbine engine, for example a turbofan engine.

The thrust reverser actuator system may be a thrust reverser actuation system for an aircraft.

The present disclosure can also be seen to provide a method of locking an actuator in a stowed position, wherein the actuator comprises a ball nut movable along an axis, and a lock housing arranged radially outwardly of the ball nut and overlapping a proximal end of the ball nut when the ball nut is in a stowed position, wherein the lock housing comprises a sleeve in which is located an aperture, and wherein a locking element is retained within the aperture and can move in a radial direction through the aperture, wherein when the ball nut is in the stowed position, the locking element engages with a locking projection on the ball nut, to retain the ball nut in the stowed position.

The present disclosure can also be seen to provide a method of locking an actuator in a stowed position, wherein the actuator comprises: a ball nut movable along an axis; a lock housing arranged radially outwardly of the ball nut and overlapping a proximal end of the ball nut when the ball nut is in a stowed position, the lock housing comprising a sleeve in which is located an aperture; and a locking element which is retained within the aperture and can move in a radial direction through the aperture, the method comprising: moving the ball nut along the axis towards the stowed position; allowing the locking element to move radially through the aperture to ride over a locking projection on the ball nut; and engaging the locking element with the locking projection on the ball nut when the ball nut is in the stowed position, thereby retaining the ball nut in the stowed position.

A locking collar may be arranged outwardly of the lock housing. The method may include moving the locking collar (along the axis) towards a distal end of the ball nut to align a recessed portion of the locking collar with the locking element, thereby allowing the locking element to move radially through the aperture to ride over a locking projection on the ball nut and into the recessed portion of the locking collar, thereby disengaging the locking element from the locking projection on the ball nut, allowing movement of the ball nut.

That is, the method may include aligning a recessed portion of the locking collar with the recessed portion of the ball nut, allowing the locking element sitting in the recessed portion of the ball nut to move radially outwards, out of the recessed portion of the ball nut, and into the recessed portion of the locking collar.

BRIEF DESCRIPTION OF DRAWINGS

A non-limiting example will now be described, with reference to the accompanying drawings, in which.

Figure 1:
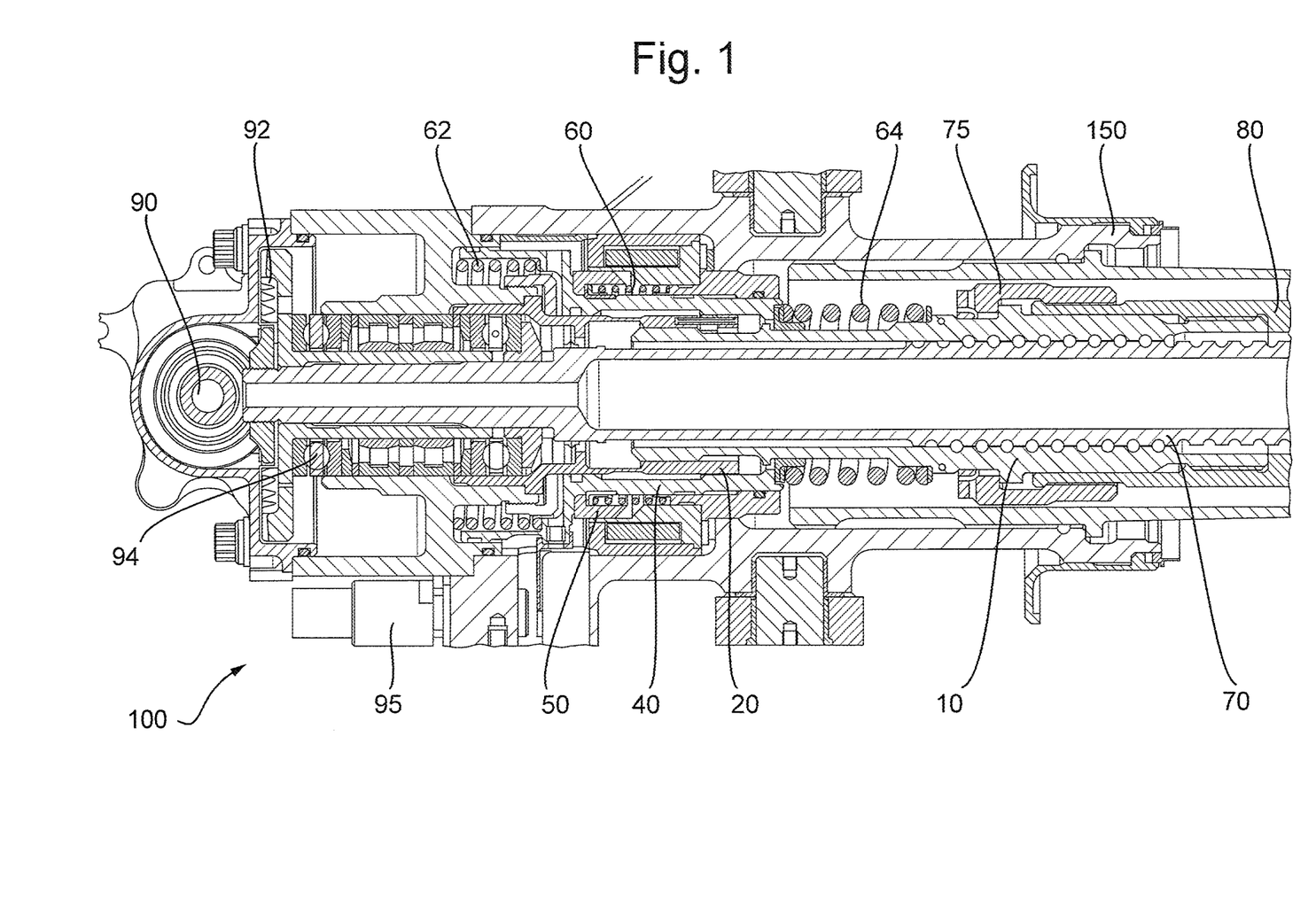
FIG. 1 shows an actuator according to an example of the present disclosure.

As shown in FIG. 1, an actuator 100 comprises a ball nut 10 provided on a ball screw shaft 70. The ball screw shaft 70 can be rotated by input torque transmission 90 via face gears 92 and bearings 94. The bearings 94 support the radial and axial loads and maintain the torque transmission.

A ring nut 75 is attached to a distal end of the ball nut 10. The ring nut 75 retains a deployment tube 80 which is attached to a TRAS moving element (thrust reverser surface 200, shown in FIG. 8). Thus, movement of the ball nut 10 causes movement of the deployment tube 80, and hence of the TRAS moving element 200.

A locking arrangement for the actuator 100, which acts to lock the ball nut 10 in a stowed (locked) position, comprises a lock housing 20, a plurality of locking elements 30 (in this case, three), a locking collar 40, and a locking projection 15 on the ball nut 10.

A proximity sensor 5 is configured to detect the actuator lock status.

Figure 4:
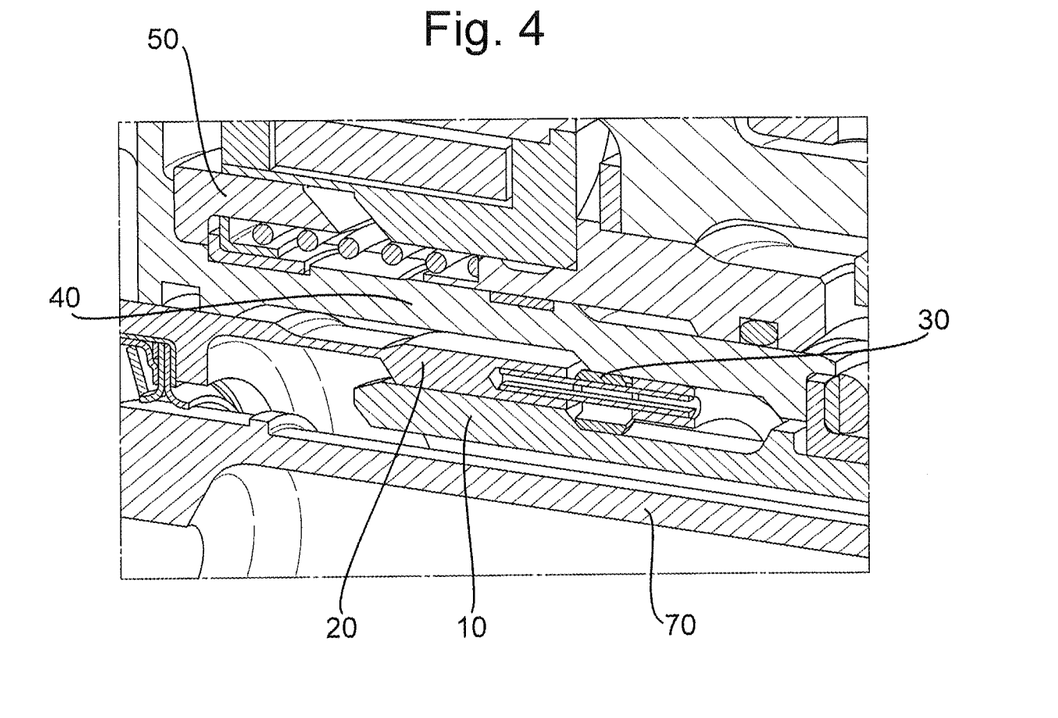
FIG. 4 is a perspective cut-away view of the actuator of FIG. 1.
Figure 5:
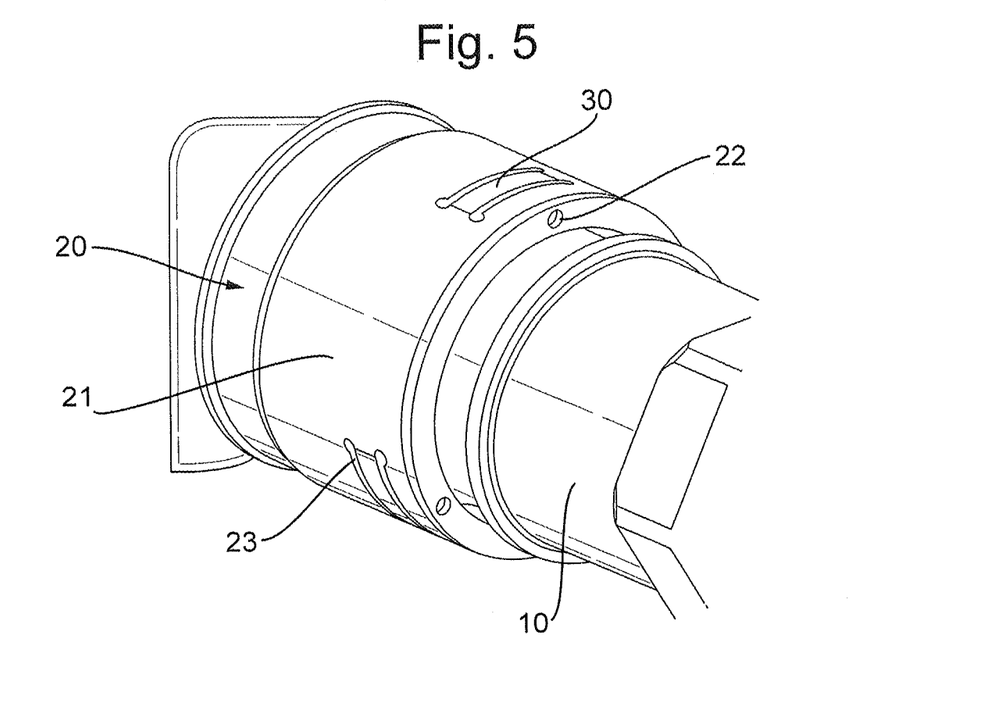
FIG. 5 is a perspective view of the ball nut and lock housing of the actuator of FIG. 1.

The lock housing 20 (best shown in FIG. 7) comprises a sleeve 21 with a plurality of apertures 23 (i.e. through holes). These are best shown in FIGS. 4 and 5. Within each aperture is provided a respective locking element 30. The locking elements 30 are able to move radially outwards and inwards through the respective apertures 23.

Whilst a plurality of apertures 23 and corresponding locking elements 30 are generally provided (in this case, three), for clarity, a single aperture 23 and locking element 30 are described below.

Figure 7:
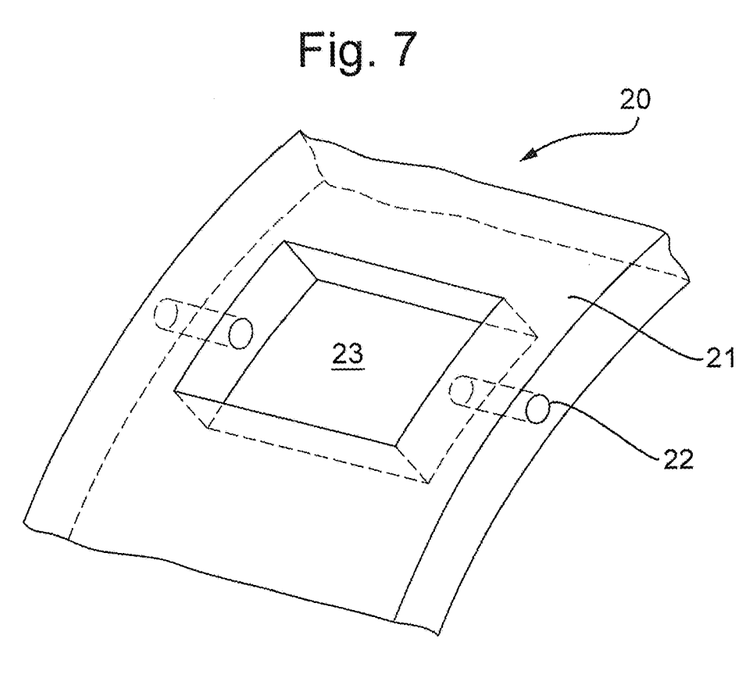
FIG. 7 is a perspective view of a lock housing of the actuator of FIG. 1.

Intersecting with the aperture 23 is a slot 22 running through the sleeve 21, along the axial length of the sleeve 21. That is, the slot 22 opens into the aperture, from both the distal and proximal sides of the aperture. The slot 22 receives a split pin 32 which also passes through a slit in the locking element 30. The locking element 30 is therefore able to move through the aperture 23 (in an outward radial direction, or an inward radial direction) and can be retained within the aperture 23 by the split pin 32, which is held within the slot 22 of the lock housing 21.

Figure 6:
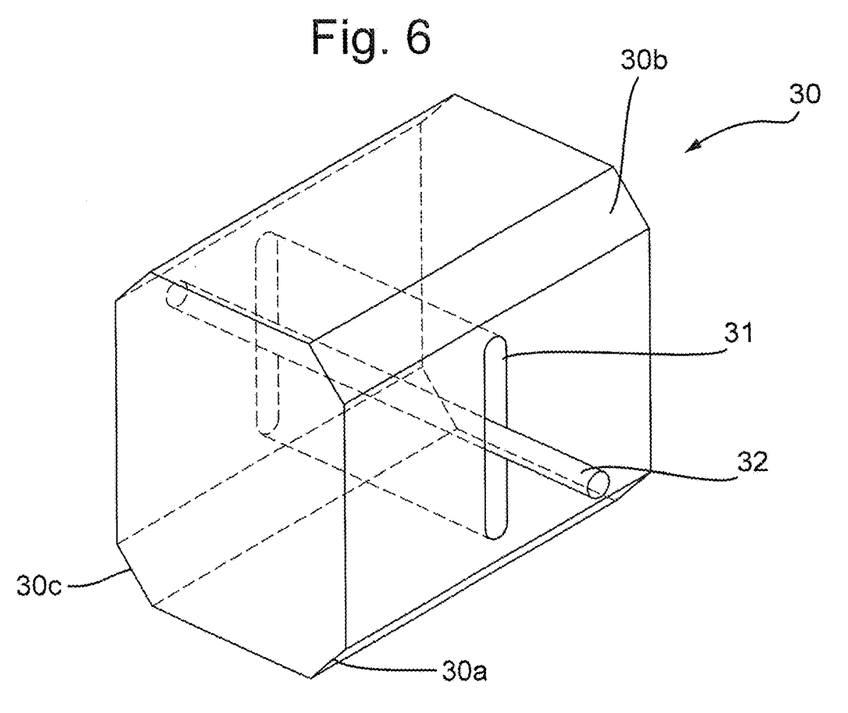
FIG. 6 is a perspective view of a locking element of the actuator of FIG. 1.

The locking element 30 (best shown in FIG. 6) is configured to engage with a locking projection 15 of the ball nut 10 (the locking projection 15 being provided at a proximal end 11 of the ball nut 10) in order to lock the ball nut 10 in a stowed position. On the distal side of the locking projection 15 (towards a distal end 12 of the ball nut 10) is a recessed portion 16 of the ball nut 10, which the locking element 30 sits in when the ball nut 10 is in the stowed position.

Radially outward of the lock housing 20 is a locking collar 40. The locking collar 40 comprises a recessed portion 42 which the locking element 30 can rise into to allow for disengagement of the locking element 30 from the locking projection 15 on the ball nut 10. The locking collar 40 is movable under the influence of a solenoid 50, and first, second and third springs 60, 62 and 64. The solenoid 50 and first and third springs 60 and 64 are configured to move the locking collar 40 towards the distal end (to the right, as shown in FIGS. 2 and 3), and the second spring 62 is configured to move the locking collar 40 towards the proximal end (to the left, as shown in FIGS. 2 and 3).

Figure 2A:
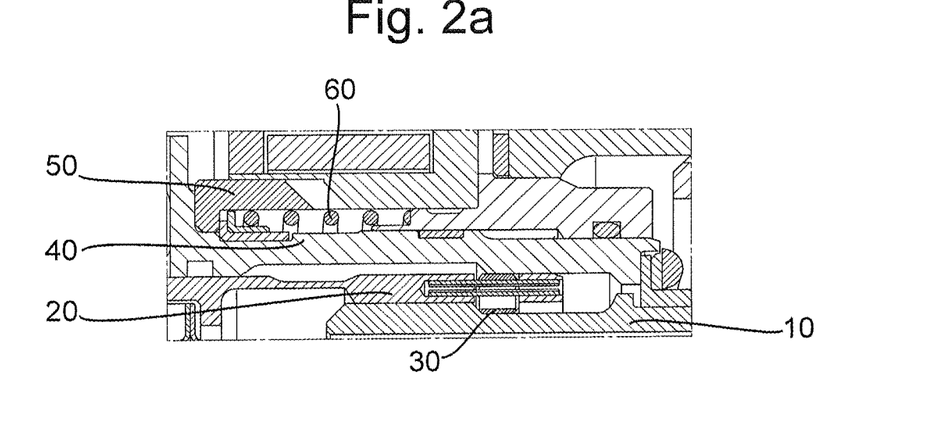
FIGS. 2(a) to 2(e) show movement of the ball nut of the actuator of FIG. 1 from a stowed to an unlocked position.
Figure 2B:
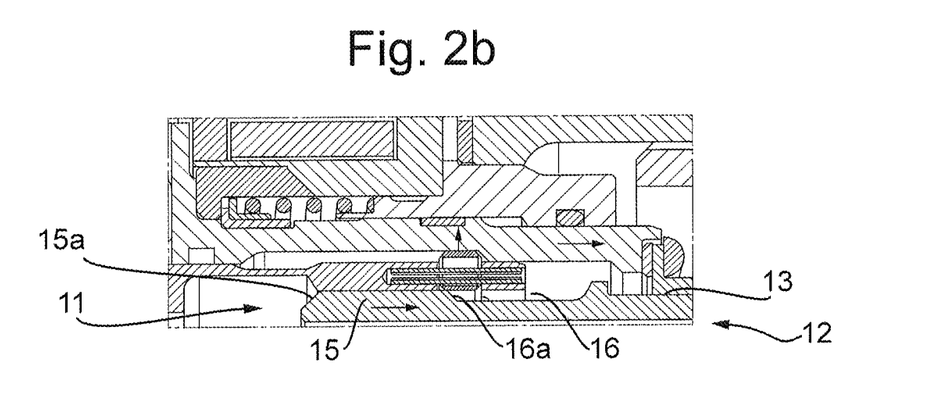
Figure 2C:
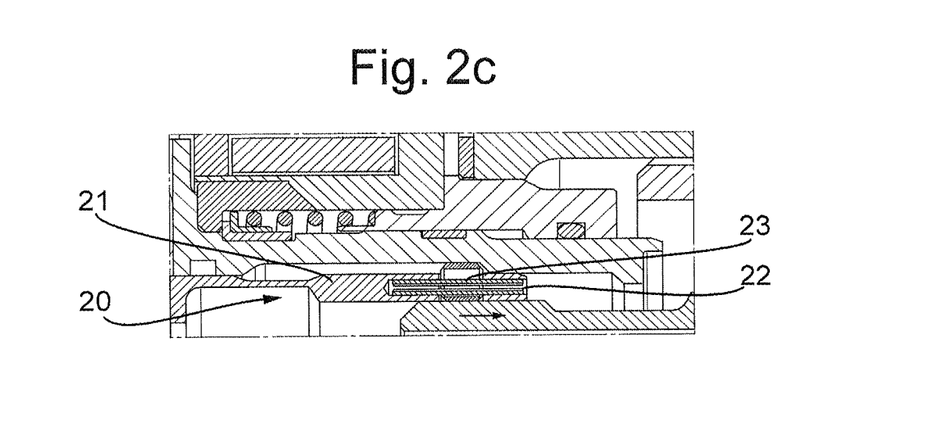
Figure 2D:
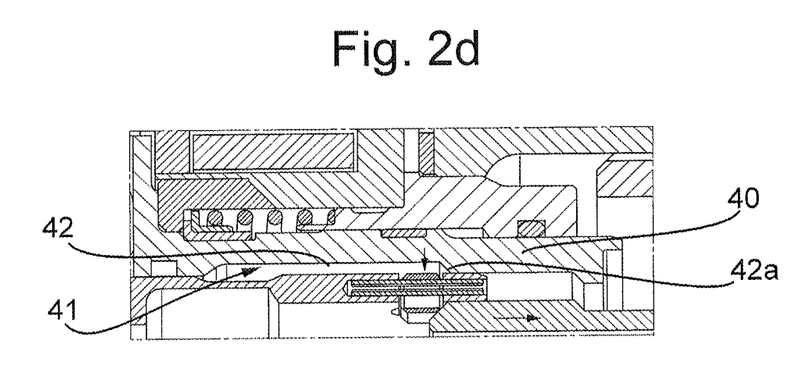
Figure 2E:
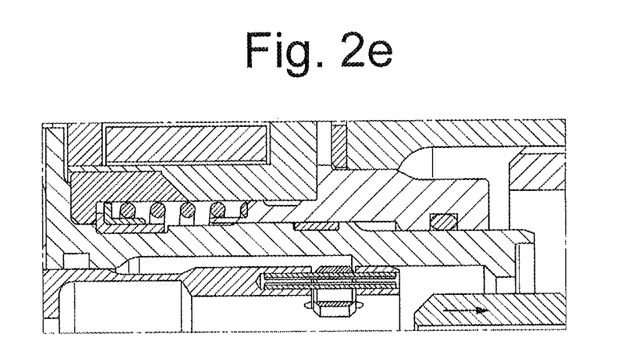

FIGS. 2(a) to 2(e) show the movement of the ball nut 10 from a stowed (and locked) position—see FIG. 2(a)—to an unlocked position—see FIG. 2(e).

In FIG. 2(a) the ball nut 10 is in a locked position. The locking element 30 is engaged with the locking projection 15 of the ball nut 10 such that movement of the ball nut 10 in the distal direction (to the right, as shown in the Figure) is not possible. The locking projection 15 on the ball nut 10 defines at least partially a recessed portion 16 of the ball nut 10 and the locking element 30 sits in the recessed portion 16 of the ball nut 10 when the ball nut 10 is in the stowed position. The locking element 30 is sandwiched (i.e. a compressive force is applied to the locking element 30) between the inner periphery 41 of the locking collar 40, and the recessed portion 16 of the ball nut 10 (which is on the outer periphery 13 of the ball nut 10).

In FIG. 2(b), the solenoid 50 is activated, causing the locking collar 40 to move towards the distal end (to the right, as shown in the Figure), aided by the force of the second spring 62, but against the resilient force of the first and third springs 60 and 64. Movement of the locking collar 40 causes a recessed portion 42 on the inner periphery 41 of the locking collar 40 to be aligned with the recessed portion 16 of the ball nut 10. As the ball nut 10 moves towards the distal direction (to the right, as shown in the Figure), driven by an electric motor (or alternatively, a hydraulic system) the alignment of the two recessed portions 16, 42 allows the locking element 30 to move radially outwards, riding along a chamfer 16a of the recessed portion 16 of the ball nut 10 (i.e. the distal side of the locking projection). The locking element 30 has a corresponding (i.e. complementary) chamfered surface 30c, such that the two chamfered surfaces ride over one another to allow smooth movement of the locking element 30 radially outwards (i.e. upwards, as shown in the Figure). Whilst the locking collar 40 and ball nut 10 are able to move relative to the actuator housing 150, the lock housing 20 is fixed.

As the ball nut 10 is driven further to the towards the distal direction (to the right, as shown in the Figure), the locking element 30 rides along a flat surface 15b of the locking projection 15, sandwiched between that surface and the recessed portion 42 of the locking collar 40. This is shown in FIG. 2(c). At this stage the ball nut is no longer locked and can be freely driven.

As shown in FIG. 2(d), as the ball nut 10 is driven further to the towards the distal direction (to the right, as shown in the Figure), a chamfered surface 30a of the locking element rides down over a correspondingly chamfered end 15a of the locking projection 15 (the proximal side of the locking projection 15) at the proximal end of the ball nut 10.

In the position shown in FIG. 2(e), the ball nut 10 has been driven further towards the distal direction (to the right, as shown in the Figure) such that the ball nut 10 is completely disengaged from the lock housing 20 and the locking element 30. In this position, the locking element 30 is retained within the aperture 23 of the lock housing sleeve 21 by the split pin 32 which passes through a slit 31 in the locking element 30 and is received within the slot 22 in the lock housing sleeve 21.

Figure 3A:
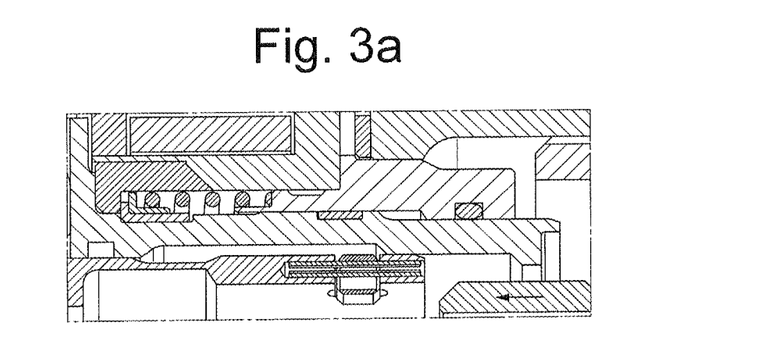
FIGS. 3(a) to 3(e) show movement of the ball nut of the actuator of FIG. 1 from an unlocked position to a stowed position.
Figure 3B:
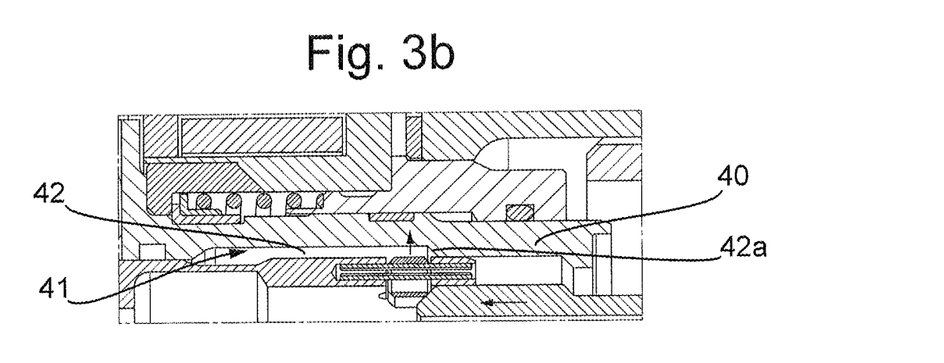
Figure 3C:
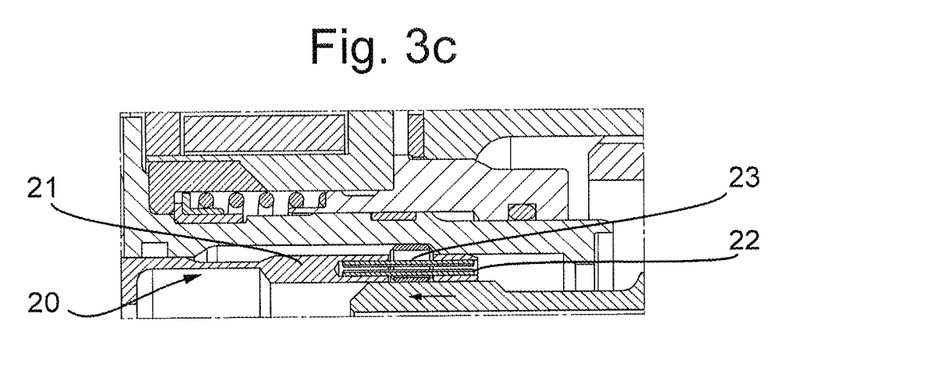
Figure 3D:
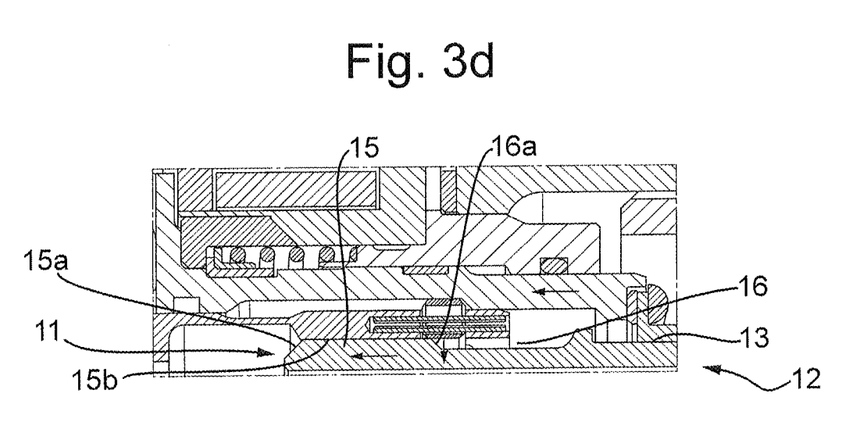
Figure 3E:
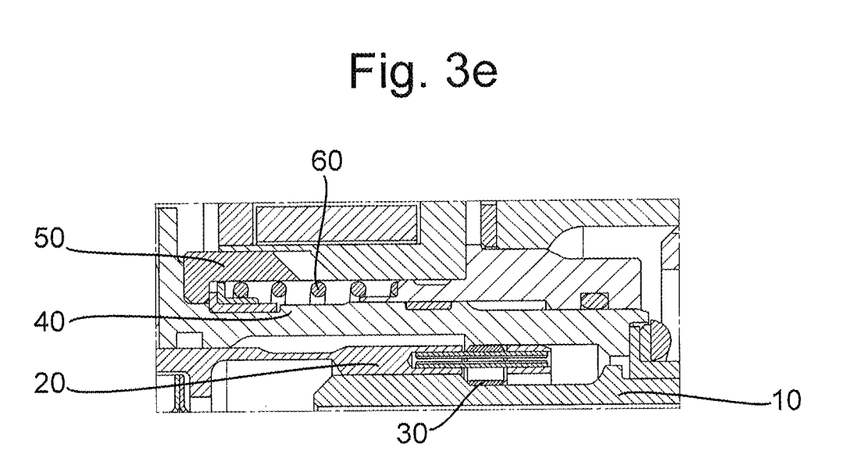

Locking of the ball nut 10 in the locked position is achieved simply by reversing the above steps. This is shown in FIGS. 3(a) to 3(e). Starting from the position shown in FIG. 3(a), (which is equivalent to FIG. 2(e)):

The ball nut 10 is driven towards the proximal direction (to the left, as shown in the Figure);

The ball nut 10 is driven further towards the proximal direction (to the left, as shown in the Figure) causing the chamfered edge 30a of the locking element 30 to engage with the chamfered edge 15a (the distal side) of the locking projection 15 of the ball nut 10 (FIG. 3(b)), such that the locking element 30 rides radially outwards (i.e. upwardly, as shown in the Figure);

The ball nut 10 is driven further towards the proximal direction (to the left, as shown in the Figure) causing the locking element 30 to be sandwiched between a flat portion 15b of the locking projection 15 and the recessed portion 42 on the inner periphery 41 of the locking collar 40 (FIG. 3(c));

The ball nut 10 is driven further towards the proximal direction (to the left, as shown in the Figure) causing the chamfered edge 30c of the locking element 30 to engage with the chamfered edge 16a of the recessed portion 16 of the ball nut 10 (FIG. 3(d)), and the chamfered edge 30b of the locking element 30 to engage with the chamfered edge 42a of the recessed portion 42 of the locking collar 40 such that the locking element 30 rides radially inwards (i.e. downwardly, as shown in the Figure);

The solenoid 50 is de-activated, and the locking collar 40 moves towards the proximal direction (to the left, as shown in the Figure) under the influence of the restoring force provided by the first and third springs 60 and 64 (FIG. 3(e), equivalent to FIG. 2(a)), thereby bringing the recessed portions 16, 42 out of alignment and trapping the locking element 30 in the recessed portion 16 of the ball nut 10.

In the foregoing example, movement of the locking collar 40 towards the distal end of the ball nut 10 is driven by a solenoid 50, and a restorative force in the opposite direction (i.e. towards the proximal end of the ball screw) is provided by the first and third springs 60 and 64. However, instead of the solenoid, a hydraulic system may be provided to provide movement of the locking collar 40. In such a case, movement of the locking collar 40 may be caused by a piston.

Whilst the above disclosure shows a lock housing 20 with three apertures 23 and three locking elements 30, the disclosure is not limited to this. The number of locking elements 30 will be chosen appropriately depending on the expected loads experienced by the system.

Figure 8:
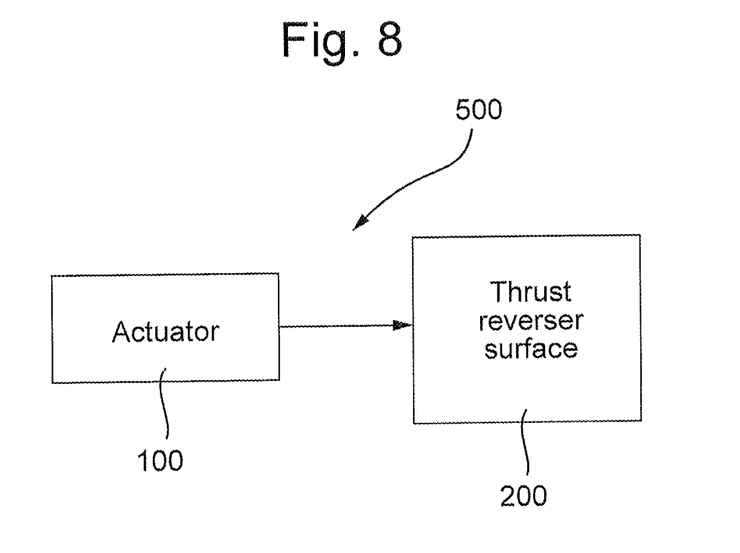
FIG. 8 is a schematic diagram of a thrust reverser actuation system.

As shown in FIG. 8, the actuator 100 may be mechanically connected to a thrust reverser surface 200 (for example, a clamshell, blocker door or translating cowl) of a thrust reverser actuation system 500, such that movement of the actuator 100 results in movement of the thrust reverser surface 200. The thrust reverser actuation system may be provided in a gas turbine engine, and particularly in a turbofan engine, for example in an aircraft.

At least in the illustrated examples it may be possible to provide an alternative to a known actuator, which is potentially more robust and allows the overall length of the actuator to be reduced.

The invention claimed is:

1. An actuator comprising:
a ball nut;
a lock housing arranged radially outwardly of the ball nut and overlapping a proximal end of the ball nut when the ball nut is in a stowed position wherein the lock housing comprises a sleeve in which is located an aperture, and wherein a locking element is retained within the aperture and can move in a radial direction through the aperture;
a locking collar which is arranged radially outwardly of the lock housing and overlaps the lock housing, wherein the locking element extends between an inner periphery of the locking collar and an outer periphery of the ball nut when the ball nut is in the stowed position,
wherein when the ball nut is in the stowed position, the locking element engages with a locking projection on the ball nut, to retain the ball nut in the stowed position, and
wherein the locking collar is arranged to move towards a distal end of the ball nut to align a recessed portion of the locking collar with the locking element to allow the locking element to ride up over the locking projection of the ball nut, thereby disengaging the locking element from the locking projection on the ball nut, allowing movement of the ball nut; and
a solenoid or hydraulic system that drives movement of the locking collar.

2. An actuator according to claim 1, wherein the locking projection on the ball nut is chamfered, and the surfaces of the locking element which engage with the locking projection on the ball nut have a corresponding chamfer.

3. An actuator-according to claim 1, wherein the lock housing is anchored to a housing of the actuator and does not move relative thereto, and/or wherein the ball nut is configured to move relative to the lock housing.

4. An actuator according to claim 1, wherein a side of the recessed portion of the locking collar is chamfered, and the surface of the locking element which engages with the side of the recessed portion of the locking collar has a corresponding chamfer.

5. An actuator according to claim 1, wherein the extent of the locking element in the radial direction is the same as the distance between the outer periphery of the ball nut and the inner periphery of the locking collar.

6. An actuator according to claim 1, wherein when the actuator includes the solenoid, the solenoid is deactivated when the ball nut is in the stowed position.

7. An actuator according to claim 1, further comprising: a spring which provides a restoring force to return the locking collar to a locking position.

8. An actuator according to claim 1, wherein the locking element comprises a slit within which is provided a split pin arranged to retain the locking element within the lock housing when the ball nut is in a disengaged position.

9. An actuator according to claim 1, wherein the ball screw is provided on a ball screw shaft.

10. An actuator according to claim 1, comprising a plurality of locking elements, and a corresponding plurality of apertures in the lock housing.

11. An actuator as according to claim 10, wherein the plurality of locking elements comprises from 2 to 4 locking elements.

12. An actuator as according to claim 10, wherein the plurality of locking elements comprises 3.

13. A thrust reverser actuation system comprising:
the actuator of claim 1;
wherein the actuator is configured to move a portion of the thrust reverser system.

14. A method of locking and unlocking an actuator in a stowed position, wherein the actuator comprises:
a ball nut movable along an axis;
a lock housing arranged radially outwardly of the ball nut and overlapping a proximal end of the ball nut when the ball nut is in a stowed position, the lock housing comprising a sleeve in which is located an aperture;
a locking element which is retained within the aperture and can move in a radial direction through the aperture; and
a locking collar which is arranged radially outwardly of the lock housing and overlaps the lock housing, wherein the locking element extends between an inner periphery of the locking collar and an outer periphery of the ball nut when the ball nut is in the stowed position;
the method comprising:
engaging the locking element with a locking projection on the ball nut when the ball nut is in the stowed position, thereby retaining the ball nut in the stowed position; and
driving the locking collar using a solenoid or a hydraulic system towards a distal end of the ball nut to align a recessed portion of the locking collar with the locking element to allow the locking element to ride up over the locking projection of the ball nut, thereby disengaging the locking element from the locking projection on the ball nut, allowing movement of the ball nut.

* * * * *